(12) United States Patent
D'Angelo et al.

(10) Patent No.: US 7,728,254 B2
(45) Date of Patent: Jun. 1, 2010

(54) METHOD FOR CONTROLLING THE QUALITY OF INDUSTRIAL PROCESSES, IN PARTICULAR LASER-WELDING PROCESSES

(75) Inventors: Giuseppe D'Angelo, Grugliasco (IT); Giorgio Pasquettaz, Vercelli (IT); Andrea Terreno, Orbassano (IT)

(73) Assignee: CRF Societa Consortile per Azioni, Torino (IT)

( * ) Notice: Subject to any disclaimer, the term of this patent is extended or adjusted under 35 U.S.C. 154(b) by 1012 days.

(21) Appl. No.: 11/033,498

(22) Filed: Jan. 12, 2005

(65) Prior Publication Data

US 2005/0179970 A1 Aug. 18, 2005

(30) Foreign Application Priority Data

Jan. 13, 2004 (IT) .......................... TO2004A0013

(51) Int. Cl.
*G06F 19/00* (2006.01)
*B23K 26/20* (2006.01)

(52) U.S. Cl. ............................ 219/121.62; 219/121.64; 219/121.83; 700/166; 706/900; 706/904

(58) Field of Classification Search ............ 219/121.61, 219/121.62, 121.64, 121.83; 702/81–84, 702/108–111; 700/32–34, 108–111, 166; 340/3.1, 3.3, 3.42, 3.43, 3.44; 706/900, 904
See application file for complete search history.

(56) References Cited

U.S. PATENT DOCUMENTS

| | | | | |
|---|---|---|---|---|
| 3,806,829 A | * | 4/1974 | Duston et al. ............. | 372/38.01 |
| 4,504,727 A | * | 3/1985 | Melcher et al. ......... | 219/121.62 |
| 4,608,527 A | * | 8/1986 | Glennon et al. ............. | 318/685 |
| 5,121,339 A | | 6/1992 | Jenuwine et al. | |
| 5,410,406 A | * | 4/1995 | Webster ........................ | 356/458 |
| 5,486,677 A | | 1/1996 | Maischner et al. | |
| 5,517,420 A | * | 5/1996 | Kinsman et al. ............. | 700/166 |
| 5,553,614 A | * | 9/1996 | Chance ........................ | 600/407 |
| 5,651,903 A | | 7/1997 | Shirk | |
| 5,659,479 A | * | 8/1997 | Duley et al. .................. | 700/166 |

(Continued)

FOREIGN PATENT DOCUMENTS

DE 199 62 967 A1 7/2001

(Continued)

*Primary Examiner*—Samuel M Heinrich
(74) *Attorney, Agent, or Firm*—Sughrue Mion, PLLC

(57) ABSTRACT

A method for controlling the quality of an industrial process, of the type that comprises the steps of: providing one or more reference signals for the industrial process; acquiring one or more real signals that are indicative of the quality of said industrial process; and comparing said one or more reference signals with said one or more real signals in order to identify defects in said industrial process. According to the invention, the method moreover comprises the operations of: obtaining a transformed signal from said reference signal; obtaining a transformed signal from said real signal; and calculating energies of said transformed reference signal and said real signal, respectively, said comparison operation comprising: comparing with one another said energies of said transformed reference signal and said transformed real signal, respectively, in order to extract corresponding time-frequency distributions for selected frequency values; calculating energies of said time-frequency distributions; and comparing the energies of said time-frequency distributions with threshold values in order to identify energy values associated to defects.

11 Claims, 3 Drawing Sheets

U.S. PATENT DOCUMENTS

| | | | | |
|---|---|---|---|---|
| 5,874,708 | A | * | 2/1999 | Kinsman et al. ........ 219/121.64 |
| 6,094,407 | A | * | 7/2000 | Kim ........................ 369/47.51 |
| 6,181,888 | B1 | * | 1/2001 | Scheuer et al. ................ 399/49 |
| 6,311,099 | B1 | * | 10/2001 | Jasper et al. ................ 700/166 |
| 6,335,504 | B1 | * | 1/2002 | Ling et al. .................. 219/109 |
| 6,400,741 | B1 | * | 6/2002 | Matsunaga et al. ....... 372/38.02 |
| 6,549,022 | B1 | * | 4/2003 | Cole et al. .................. 324/752 |
| 6,661,820 | B1 | * | 12/2003 | Camilleri et al. ......... 372/38.09 |
| 6,674,044 | B2 | * | 1/2004 | Bolognese et al. ..... 219/121.73 |
| 6,901,353 | B1 | * | 5/2005 | Huang ....................... 702/189 |
| 6,914,215 | B2 | * | 7/2005 | Davis et al. ............ 219/121.85 |
| 7,107,118 | B2 | * | 9/2006 | Orozco et al. .............. 700/166 |
| 2002/0144984 | A1 | * | 10/2002 | Mori et al. ............ 219/121.64 |
| 2005/0222515 | A1 | * | 10/2005 | Polyshchuk et al. ......... 600/528 |
| 2007/0146696 | A1 | * | 6/2007 | Noguchi et al. .......... 356/237.5 |
| 2009/0001262 | A1 | * | 1/2009 | Visser et al. ................ 250/282 |

FOREIGN PATENT DOCUMENTS

| | | | | |
|---|---|---|---|---|
| EP | 0934796 | A1 | * | 8/1999 |
| EP | 1 238 744 | A1 | | 9/2002 |
| EP | 1 275 464 | A1 | | 1/2003 |
| EP | 1 371 443 | A1 | | 12/2003 |
| JP | 85016877 | B | * | 4/1985 |
| JP | 409057476 | A | * | 3/1997 |
| JP | 02003053569 | A | * | 2/2003 |
| JP | 2003334679 | A | * | 11/2003 |

* cited by examiner

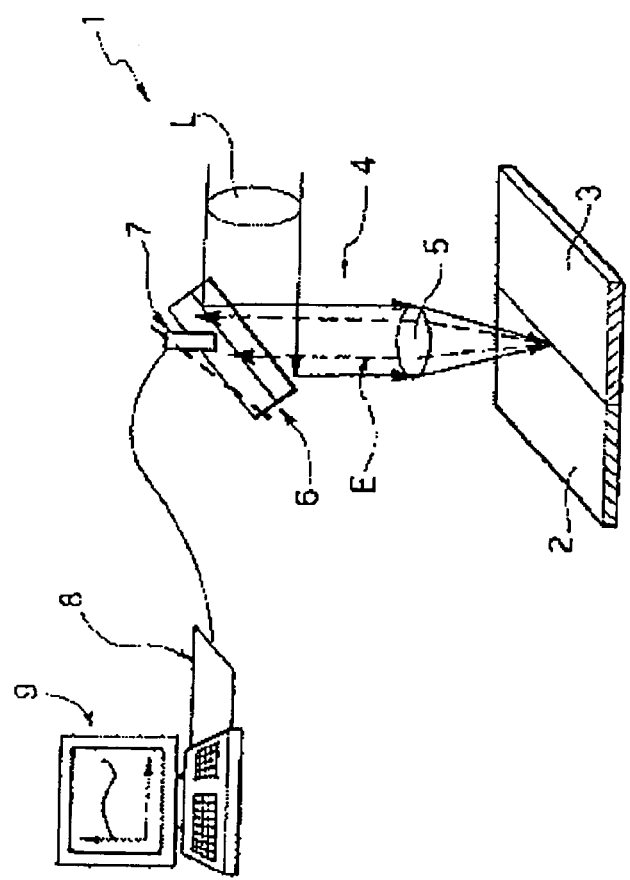
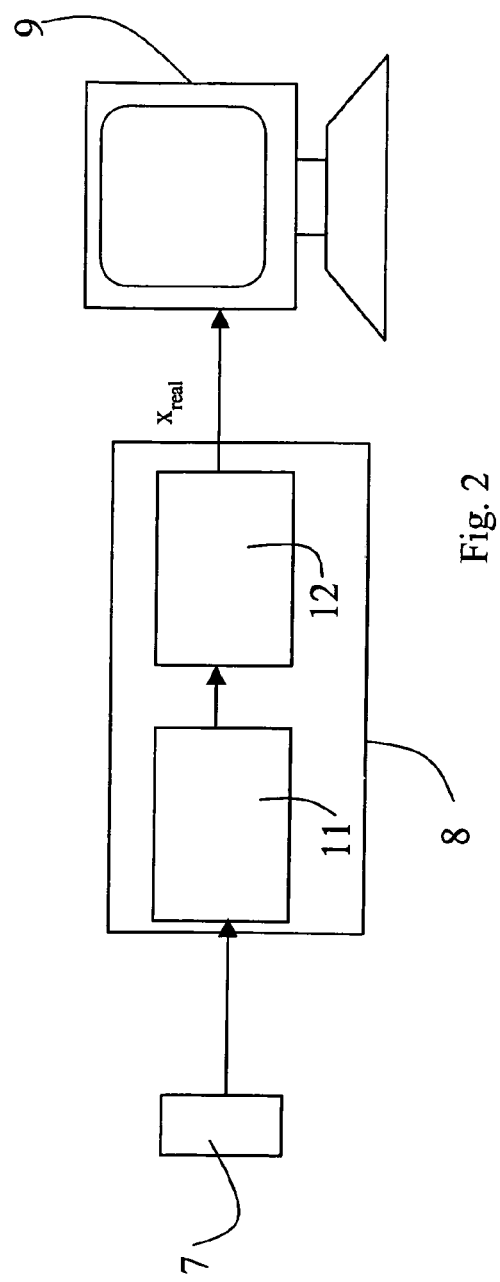

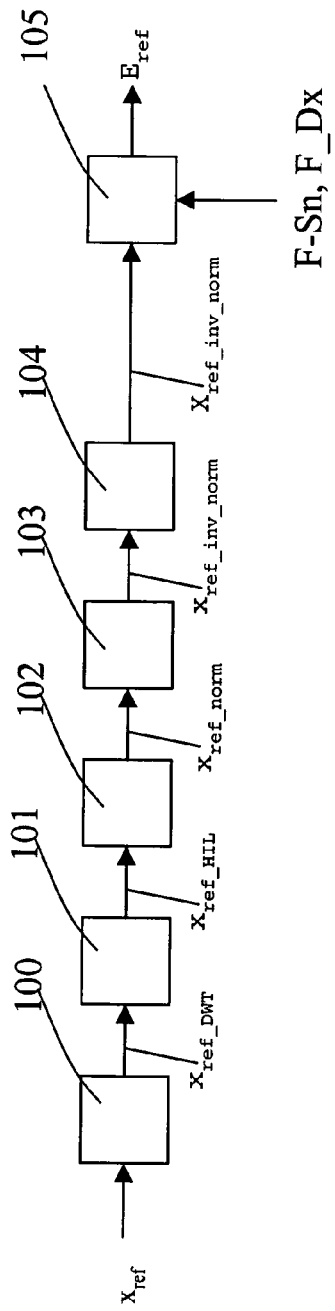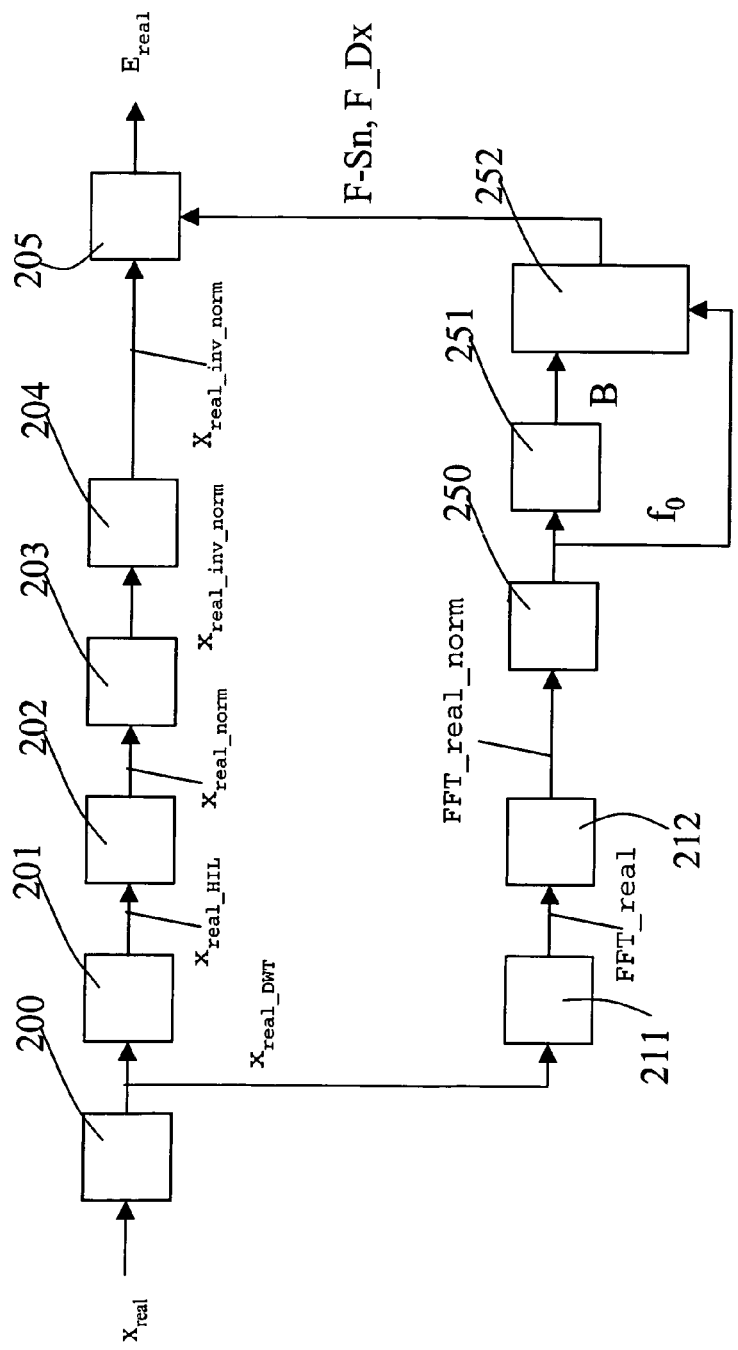

METHOD FOR CONTROLLING THE QUALITY OF INDUSTRIAL PROCESSES, IN PARTICULAR LASER-WELDING PROCESSES

BACKGROUND OF THE INVENTION

The present invention relates to methods for controlling the quality of an industrial process, comprising the steps of:

providing one or more reference signals for an industrial process;

acquiring one or more real signals that are indicative of the quality of said industrial process; and comparing said one or more reference signals with said one or more real signals in order to identify defects in said industrial process.

Monitoring of the defects in industrial processes assumes increasing economic importance on account of its impact on the analysis of quality of industrial products. The possibility of obtaining an on-line and automatic assessment of the quality of an industrial process presents many advantages both from the economic point of view and from the standpoint of the speed of the process. Desirable characteristics of the system are hence:

on-line and real-time processing; and capacity for accurate recognition of the main defects in production.

Currently the problem of recognition of the quality of an industrial process, and consequently the identification of defects, is approached by an inspection carried out off line by skilled staff, or else using automatic methods, which, by means of sensors, identify only some of the defects listed above, in a way that is far from satisfactory and is moreover sensitive to the different settings of the machine.

There are known methods and systems for controlling the quality in industrial processes, for example applied to on-line monitoring of the laser-welding process, in particular in the case of welding of sheet metal. The control system is able to assess the presence of porosities in the welding area or else, in the case of butt-welded thin sheet metal, the presence of defects due to overlapping or poor jointing of the sheet metal.

The above used systems base quality control on a comparison between the signals detected during the process and one or more predetermined reference signals indicating a good-quality weld. Said reference signals, which usually range in number between two and ten, are arranged starting from a number of samples of good-quality welds. Obviously, said mode of procedure implies the presence of a skilled operator who is able to certify the goodness of the weld at the moment of creation of the reference signals, and involves expenditure in terms of time and sometimes also in terms of waste of material (used for making the samples necessary for obtaining the reference signals). In some cases there are also pre-arranged reference signals indicating a defective weld, this, however, involving additional problems and difficulties.

From the European patent application No. EP-A-1275464 filed in the name of the present applicant, it is known to split into blocks the signal acquired via photodiode, which collects the radiation emitted by a welding spot, calculating the mean of the signal in each block sampled and considering the blocks having a value smaller than or equal to the offset of the photodiode as indicating the presence of a defect. Said method eliminates the need for the reference signal; however, it enables only a very approximate detection of the defects.

SUMMARY OF THE INVENTION

The aim of the present invention is to overcome all the aforesaid drawbacks.

In order to achieve such aim, the object of the present invention is a method for controlling the quality of industrial processes which has the characteristics indicated at the beginning and is further characterized in that said method further comprises the operations of:

obtaining a transformed signal from said reference signal;

obtaining a transformed signal from said real signal; and calculating energies of said transformed reference signal and said real signal, said comparison operation comprising:

comparing with one another said energies of said transformed reference signal and said transformed real signal for extracting corresponding time-frequency distributions for selected frequency values;

calculating energies of said time-frequency distributions; and comparing the energies of said time-frequency distributions with threshold values in order to identify the energy values associated to defects.

In the preferred embodiment, said steps of obtaining a transformed signal from said reference signal and of obtaining a transformed signal from said real signal comprise a filtering operation by means of the application of a discrete wavelet transform (DWT), whilst said operation of comparing said energies of said transformed reference signal and said transformed real signal for obtaining corresponding time-frequency distributions comprises performing a calculation of the conjugate of the Fourier transform of the envelope of the real signal and of the envelope of the normalized signal, to obtain a real conjugated transformed signal and a reference conjugated transformed signal, respectively, as well as comparing the energies of the reference signal and of the real signal, extracting the frequency values for which the energy of the real signal is greater than that of the reference signal.

BRIEF DESCRIPTION OF THE DRAWINGS

Of course, a further object of the invention is the system for controlling the quality of industrial processes that implements the method described above, as well as the corresponding computer product, directly loadable into the memory of a computer, such as a processor, and comprises software code portions for performing the method according to the invention when the product is run on a computer.

Further characteristics and advantages of the invention will emerge from the ensuing description, with reference to the annexed drawings, which are provided purely by way of non-limiting example and in which:

FIG. 1 is a block diagram representing a system implementing the method according to the invention;

FIG. 2 shows a detail of the system of FIG. 1;

FIGS. 3, 4 and 5 are flowcharts representing operations of the method according to the invention.

Figure 5:
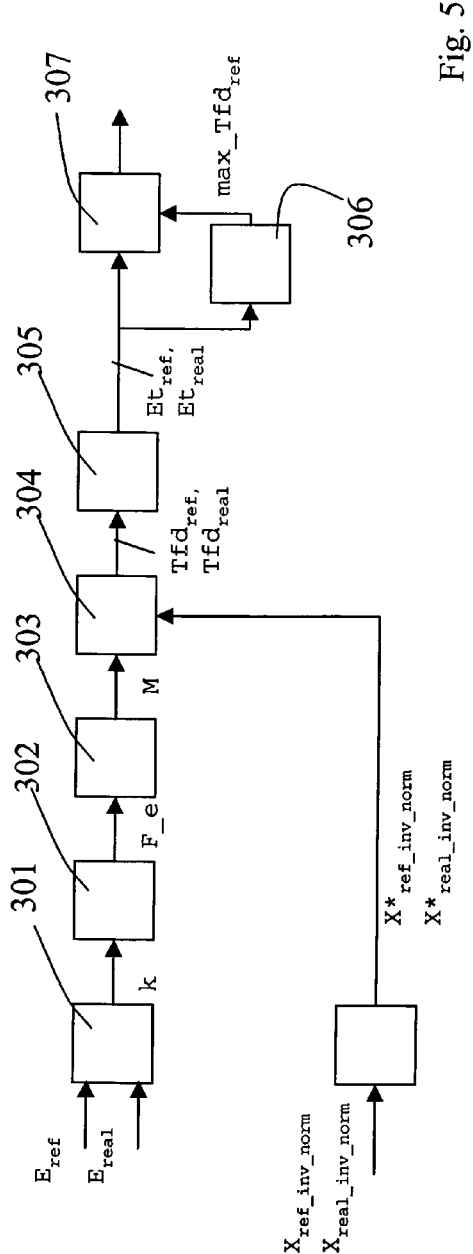

The method according to the invention will now be exemplified with reference to a laser-welding method. Said laser-welding method constitutes merely, however, just one non-limiting example of an industrial process to which the method for controlling the quality of industrial processes according to the invention can be applied.

DETAILED DESCRIPTION OF THE INVENTION

With reference to FIG. 1, the reference number 1 indicates, as a whole, a system for controlling the quality of a laser-welding process. The example relates to the case of two pieces of sheet metal 2, 3, which are welded by means of a laser beam. The number 4 designates as a whole the focussing head, including a lens 5, at which there arrives the laser beam originated by a laser generator (not illustrated) and reflected by a half-reflecting mirror 6, after passage through a lens L. The radiation E emitted by the welding area passes through the half-reflecting mirror 6 and is detected by a sensor 7 constituted by a photodiode that is able to send its outgoing signal to an electronic control and processing unit 8, associated to a personal computer 9.

In a concrete embodiment, the half-reflecting mirror 6 used is a mirror made of ZnSe, with a diameter of 2 ins and a thickness of 5 mm. The sensor 7 is made up of a photodiode with a spectral response of between 190 nm and 1100 nm and an active area of 1.1×1.1 mm and a quartz window.

FIG. 2 illustrates in greater detail the electronic control and processing unit 8 associated to the personal computer 9. Said processing unit 8 comprises an anti-aliasing filter 11, which operates on the signal sent by the sensor 7. There is then envisaged an acquisition card 12 equipped with an analog-to-digital converter, which samples the filtered signal and converts it numerically. Said acquisition card 12 is preferably directly associated to the personal computer 9.

Once again in the case of a concrete embodiment, the acquisition card 12 is a data-acquisition card of the type PC card NI 6110E, with a maximum frequency of acquisition of 5 Msamples/s.

The anti-aliasing filter 11 carries out a filtering of the signal by means of a low-pass filter (for example a Butterworth IIR filter).

In the personal computer 9, according to the invention there is implemented a method for quality control, which is based upon a comparison of a real signal $x_{real}$, acquired via the photodiode 7 and a reference signal $x_{ref}$, representing a defective weld, stored in said personal computer 9.

The reference signal, designated by $x_{ref}(t)$ is acquired at a frequency of acquisition $f_s$, and hence, according to Nyquist's theorem, has associated to it a frequency band of the signal having the value of $f_s/2$, whilst the number of samples acquired for the reference signal $x_{ref}(t)$ is N.

FIG. 3 illustrates a flowchart representing the operations performed on the reference signal $x_{ref}(t)$.

In a first step 100, an operation of filtering of the reference signal $x_{ref}(t)$ is performed by means of the application of a discrete wavelet transform (DWT). At output from the step 100 there is thus obtained a signal $x_{ref\_DWT}$ having N/2 samples in the band $0:f_s/4$.

Subsequently, a Hilbert-transform operation is applied to the signal $x_{ref\_DWT}$ in a step 101, to obtain a complex analytical signal $x_{ref\_HIL}$, having N/2 samples and null negative frequencies.

A normalization operation is applied to said analytical signal $x_{ref\_HIL}$, in a step 102, which produces at output a normalized signal $x_{ref\_norm}$.

On said normalized signal $x_{ref\_norm}$ there is then performed, in a step 103, an operation of calculation of an envelope of the normalized signal, designated by $x_{ref\_inv\_norm}$, whilst in a step 104, a fast-Fourier-transform (FFT) operation is applied to said envelope of the normalized signal $x_{ref\_inv\_norm}$, to obtain a transformed envelope $X_{ref\_inv\_norm}$.

Finally, in a step 105, an operation of calculation of the energy of the reference signal, designated by $E_{ref}$, is performed by applying the relation:

$$\int |x_{ref\_inv\_norm}(t)|^2 dt = \int |X_{ref\_inv\_norm}(f)|^2 df \quad (1)$$

As regards the real signal $x_{real}(t)$, also this is acquired at a frequency of acquisition $f_s$, and thus, according to Nyquist's theorem, has associated to it a frequency band of the signal having a value of $f_s/2$, whilst the number of samples acquired for the real signal $x_{real}(t)$ is N.

FIG. 4 illustrates a flowchart representing the operations performed on the real signal $x_{real}(t)$.

In particular, represented in FIG. 4 is a first step 200, in which an operation of filtering of the real signal $x_{real}(t)$ is performed by the application of a DWT. At output from step 200, there is thus obtained a signal $x_{real\_DWT}$ having N/2 samples in the band $0:f_s/4$.

A fast-Fourier-transform operation is performed on said signal $x_{real\_DWT}$, in a step 211, to obtain a transformed signal FFT$_{\_real}$, which, subsequently, in a step 212, is normalized, to obtain a transformed normalized signal FFT$_{\_real\_norm}$.

In a step 250, an operation of calculation of a mean frequency $f_0$ is performed on the transformed normalized signal FFT$_{\_real\_norm}$, according to the relation:

$$f_0 = \int f * FFT_{\_real\_norm}(f) * FFT_{\_real\_norm}(f) df \quad (2)$$

In a step 251, an operation of calculation of a standard deviation B is performed, according to the relation:

$$B = (\int f^2 * FFT_{\_real\_norm} * FFT_{\_real\_norm} df - f_0^2)^{1/2} \quad (3)$$

In a step 252, there are then calculated a lower band F_Sn=$(f_0-B/2)$ and an upper band F_Dx=$(f_0+B/2)$.

In parallel, in a step 201, a Hilbert-transform operation is applied to the signal $x_{real\_DWT}$, to obtain a complex analytical signal $x_{real\_HIL}$, which has N/2 samples and having null negative frequencies.

In a step 202, a normalization operation is applied to said analytical signal $x_{real\_HIL}$, which produces at output a normalized signal $x_{real\_norm}$.

On said normalized signal $x_{real\_norm}$ there is then performed, in a step 203, an operation of calculation of the envelope, designated by $x_{real\_inv\_norm}$, whilst, in a step 204, a fast-Fourier-transform operation (FFT) is applied to said envelope of the normalized signal $x_{real\_inv\_norm}$, to obtain a transformed envelope $X_{real\_inv\_norm}$.

Finally, in a step 205, an operation of calculation of an energy of the real signal $E_{real}$ is performed by applying the following relation:

$$\int |x_{real\_inv\_norm}(t)|^2 dt = \int |X_{real\_inv\_norm}(f)|^2 df \quad (4)$$

The operations of calculation of the energies $E_{real}$ and $E_{ref}$ are performed in a band delimited between the lower band F_Sn and the upper band F_Dx calculated in step 252. In greater detail, the calculation is performed on the band thus delimited, considering frequency steps, for example of one hertz, i.e., $$\int_{F\_Sn}^{step} |X_{real\_inv\_norm}(f)|^2 df \quad \int_{step}^{F\_DX} |X_{real\_inv\_norm}(f)|^2 df$$

$$\int_{F\_Sn}^{step} |X_{ref\_inv\_norm}(f)|^2 df \quad \int_{step}^{F\_DX} |X_{ref\_inv\_norm}(f)|^2 df$$

In this way, the operation of calculation of the energies $E_{ref}$ and $E_{real}$ produces two respective vectors, namely a vector of energies of the reference signal Energy_Ref_step (1, ... k), and a vector of energies of the real signal Energy_Real_step (1, ... k), both comprising k frequency values.

Subsequently, a procedure of calculation of the quadratic time-frequency distributions is performed, illustrated in the flowchart of FIG. 5, which comprises the following operations:

in a step designated by 300, calculating the conjugates of the fast-Fourier transforms (FFTs) of the envelope of the real signal $X_{real\_inv\_norm}(f)$ and of the envelope of the reference signal $X_{ref\_inv\_norm}(f)$, to obtain conjugated transformed signals, namely, the real conjugated transformed signal $X^*_{real\_inv\_norm}(f)$ and the reference conjugated transformed signal $X^*_{ref\_inv\_norm}(f)$, respectively;

in a step 301, considering the energies of the reference signal $E_{ref}$ and of the real signal $E_{real}$, represented, respectively, by the vector of energies of the reference signal Energy_Ref_step (1, ... k) and the vector of energies of the real signal Energy_Real_step (1, ... k), and, for each element k of said two vectors, assessing whether the following criterion is satisfied:

$$\text{Energy\_Real\_step }(1,\ldots k) > \text{Energy\_Ref\_step }(1\ldots k) \quad (5)$$

Figure 6:
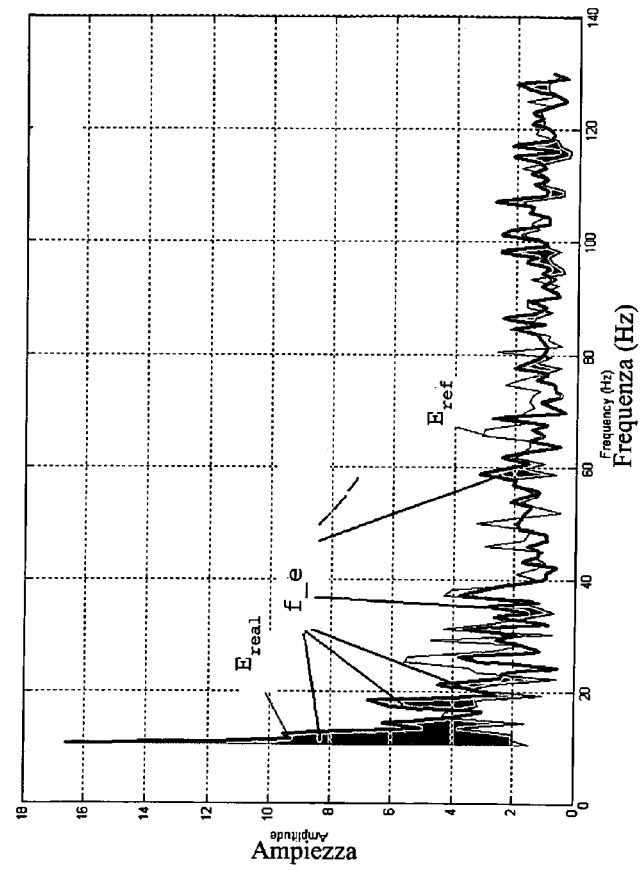
FIG. 6 is a diagram of quantities processed by the method according to the invention.

This operation can be appreciated also with reference to the graph of FIG. 6, which shows the amplitudes of the energy of the reference signal $E_{ref}$ and of the energy of the real signal $E_{real}$ (thicker line) as a function of the frequency;

if the criterion (5) is satisfied, in a step 302 carrying out an operation of extraction of the frequency value for which said criterion (5) is verified, said value being indicated as f_e; according to how many times the condition is satisfied, obtaining up to a maximum of k frequency values f_e; FIG. 6 shows the regions corresponding to the frequency values f_e for which the criterion (5) is satisfied;

in a step 303, constructing a matrix M, the rows of which are represented by the extracted frequency values f_e, whilst the columns are represented by N/2 temporal values $t_1 \ldots t_{N/2}$ of the signal at output from the DWT operation 200;

in a step 304, for each row of the matrix M, calculating a quadratic time-frequency distribution both for the reference signal, designated by $Tfd_{ref}$ and for the real signal, designated by $Tfd_{real}$, using the Margenau-Hill relation, namely $$Tfd_{real} = \text{Real}(x_{real\_DWT}(t) \cdot X_{real\_inv\_norm}^*(f) \cdot \text{and}^{-j2\pi f}) \quad (6)$$

$$Tfd_{ref} = \text{Real}(x_{ref\_DWT}(t) \cdot X_{ref\_inv\_norm}^*(f) \cdot \text{and}^{-j2\pi f}) \quad (7)$$

then, in a step 305, calculating, for both the reference signal and the real signal, energies associated to the distributions for each instant of time, designated as $Et_{ref}$ and $Et_{real}$, respectively; and then, in a step 306, calculating a maximum value of the energy $\max\_Tfd_{ref}$ for the time-frequency distribution of the reference $Tfd_{ref}$.

Finally, in order to obtain an estimate of the defects, in a step 307 each temporal value of the energy $Et_{real}$ of the quadratic time-frequency distribution of the real signal $Tfd_{real}$ is compared with the maximum value of the energy $\max\_Tfd_{ref}$.

If said value of energy of the quadratic time-frequency distribution of the real signal $Tfd_{real}$ exceeds the maximum value of the energy $\max\_Tfd_{ref}$, this means that there is a defect on that time co-ordinate.

In this way, it is possible to locate the defects in time.

Of course, without prejudice to the principle of the invention, the details of construction and the embodiments may vary widely with respect to what is described and illustrated herein purely by way of example, without thereby departing from the scope of the present invention.

The invention claimed is:

1. A method for controlling quality of a manufacturing process for recognizing defects in result of a production, the method comprising:

acquiring, by detecting one or more quantity of the production of said manufacturing process, one or more real signals produced by a machine involved in the manufacturing process, where the one or more real signals are indicative of the quality of said manufacturing process;

providing one or more reference signals corresponding to said one or more real signals and indicative of a good-quality process for the manufacturing process;

obtaining a transformed signal from said reference signal;

obtaining a transformed signal from said real signal;

converting each of the transformed real signal and the transformed reference signal into a respective vector of energies, where the vector of energies comprises an integer number k of frequency values; and comparing said one or more reference signals with said one or more real signals in order to identify the defects in the result of the production, wherein said comparing comprises:

comparing said vector of energies of said transformed reference signal with said vector of energies of said transformed real signal and selecting frequency values among said k frequency values on the basis of said comparison, respectively, for extracting corresponding time-frequency distributions for said selected frequency values;

calculating energies of said time-frequency distributions; and comparing the energies of said time-frequency distributions with threshold values in order identify energy values associated with said defects, and the corresponding time coordinates of said defects.

2. The method according to claim 1, wherein said steps of obtaining a transformed signal from said reference signal and of obtaining a transformed signal from said real signal comprise a filtering operation by means of the application of a discrete wavelet transform.

3. The method according to claim 2, wherein said steps of obtaining a transformed signal from said reference signal and of obtaining a transformed signal from said real signal moreover comprise the operations, applied both to the reference signal and to the real signal, of:

applying a Hilbert transform to the signal obtained from the filtering operation;

normalizing the signal obtained from the Hilbert-transform operation;

calculating an envelope of the normalized signal;

applying an FFT to said envelope of the normalized signal to obtain said transformed reference signal and said transformed real signal, respectively.

4. The method according to claim 2 wherein it further comprises executing a Fourier-transform operation on the real signal obtained from the filtering operation by means of the application of a DWT to obtain a second transformed signal, and normalizing said second transformed signal to obtain a second transformed normalized signal.

5. The method according to claim 2, wherein it further comprises processing said second transformed normalized signal for obtaining a set of values representing the spectrum of the real signal.

6. The method according to claim 5, wherein it uses at least part of said set of values representing the spectrum of the real signal for calculating said energies of said transformed reference signal and said transformed real signal, respectively.

7. The method according to claim 2, wherein said operation of comparing said energies of said transformed reference signal and said transformed real signal, respectively, to obtain corresponding time-frequency distributions, comprises the operations of:

calculating a conjugate of the fast-Fourier transform of said transformed reference signal and said transformed real signal, respectively, to obtain a real conjugated transformed signal and reference conjugated transformed signal;

comparing with one another the energies of the reference signal and of the real signal, extracting the frequency values for which the energy of the real signal is greater than the energy of the reference signal;

constructing a matrix, the rows of which are represented by said extracted frequency values and the columns of which are represented by the temporal values of the signal obtained from the filtering operation via DWT;

calculating for each row of said matrix a quadratic time-frequency distribution for the reference signal and for the real signal.

8. The method according to claim 2, wherein said operation of calculating, for each row of said matrix, a quadratic time-frequency distribution for the reference signal and for the real signal is performed by applying the Margenau-Hill relation.

9. The method according to claim 2, wherein said operation of calculating energies of said time-frequency distributions comprises the operations of:

calculating said energies for each instant of time and calculating moreover a maximum value of the energy; using said maximum value of the energy as threshold value; and comparing said maximum value of the energy with each temporal value of the energy of the quadratic time-frequency distribution of the real signal in order to identify the energy values associated to defects.

10. The method according to claim 1, wherein the manufacturing process is a laser welding process.

11. The method according to claim 1, wherein the conversion of the real signal is performed using the following equation:

$$\int |x_{real\_inv\_norm}(t)|^2 dt = \int |X_{real\_inv\_norm}(f)|^2 df \qquad (4).$$

* * * * *